United States Patent [19]

Aduvala

[11] Patent Number: 5,741,137
[45] Date of Patent: Apr. 21, 1998

[54] EDUCATIONAL CARDS TEACHING EMOTIONAL EXPRESSIONS

[76] Inventor: Prasad V Aduvala, 270 Queens Quay #3007, Toronto, Ontario, Canada, M5J 2N4

[21] Appl. No.: 850,373

[22] Filed: May 2, 1997

[51] Int. Cl.⁶ .................................................. G09B 19/00
[52] U.S. Cl. ................................... 434/236; 273/292
[58] Field of Search .............................. 434/236, 238, 434/237; 273/292, 302

[56] References Cited

U.S. PATENT DOCUMENTS

| | | | |
|---|---|---|---|
| 2,959,871 | 11/1960 | Hunkavaara | 434/236 |
| 4,741,701 | 5/1988 | Kossor | 434/238 |
| 4,931,934 | 6/1990 | Snyder | 434/236 |
| 5,190,459 | 3/1993 | Determan | 434/236 |
| 5,372,509 | 12/1994 | Brocato et al. | 434/236 |
| 5,470,235 | 11/1995 | Papaleo | 434/238 |
| 5,580,254 | 12/1996 | Ramsey | 434/236 |

*Primary Examiner*—Paul J. Hirsch

[57] ABSTRACT

New educational cards for teaching emotional expressions, for assisting children with recognizing emotions, thoughts, and actions in daily life. The inventive device includes a first plurality of cards having words disposed thereon representing personal attributes, and a second plurality of cards having words disposed thereon representing societal attributes. The first and second plurality of cards further include a symbol to indicate whether the personal attributes and societal attributes are positive or negative attributes. The cards also include additional symbols thereon to indicate an emotional intensity level of the attributes and a level of self-esteem associated with the attributes.

6 Claims, 2 Drawing Sheets

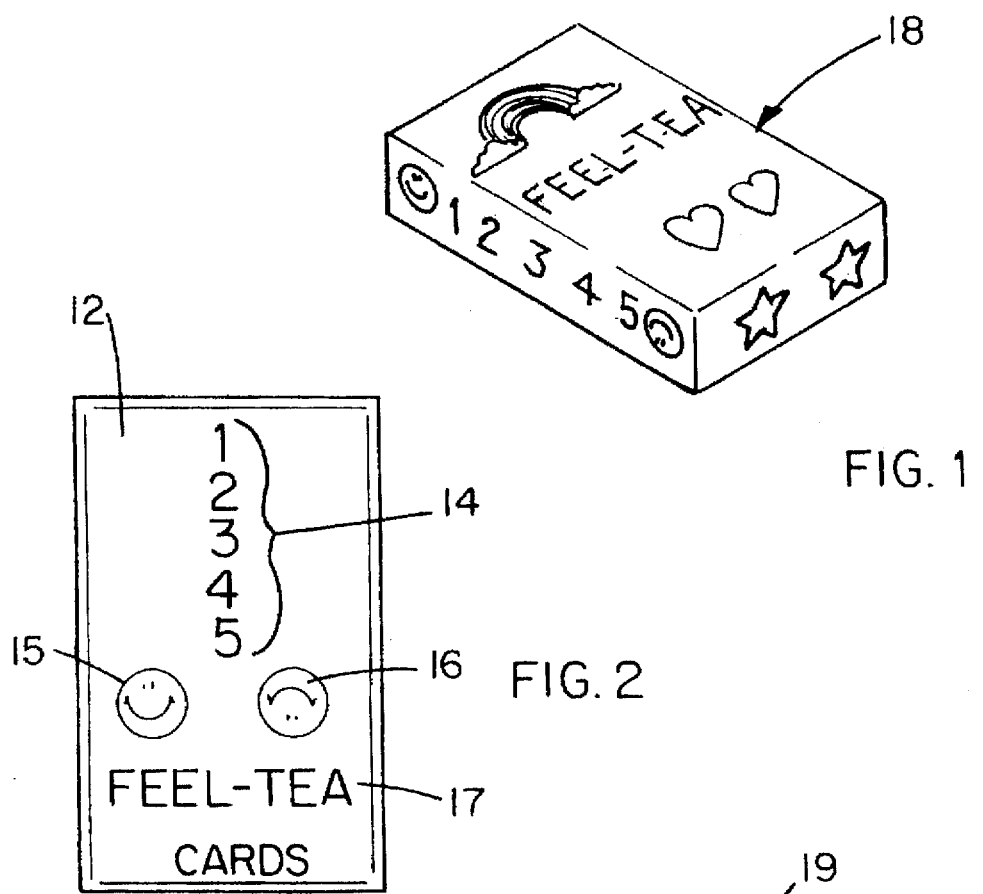
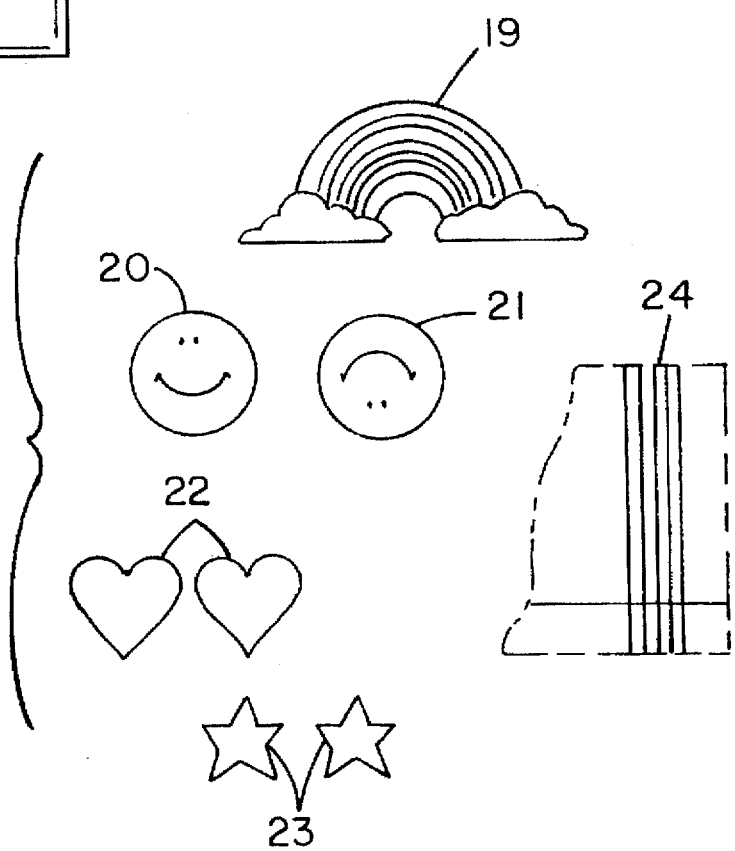

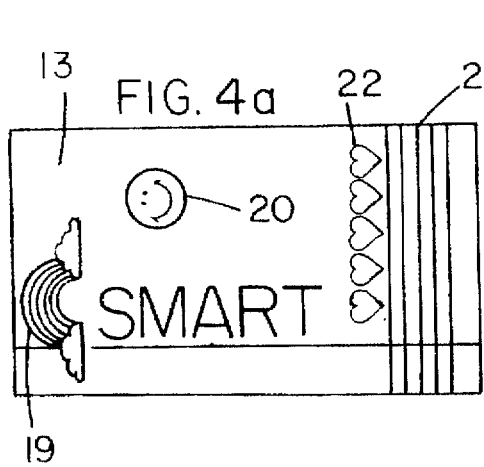
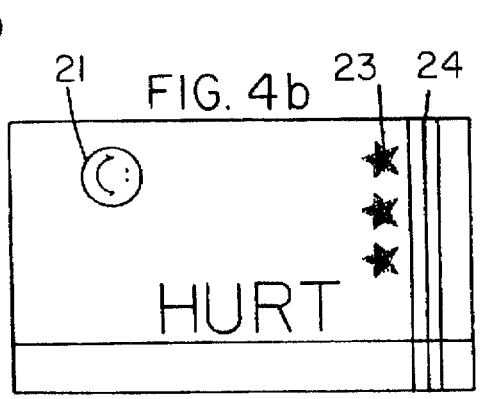
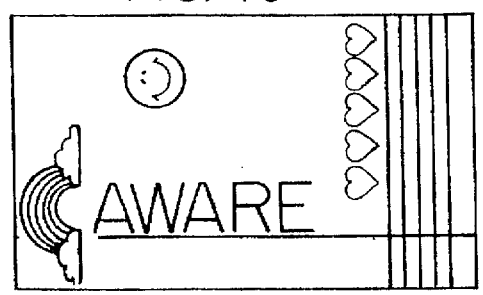
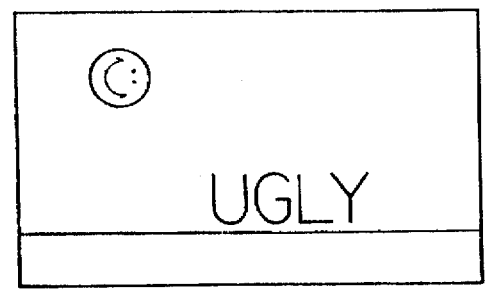
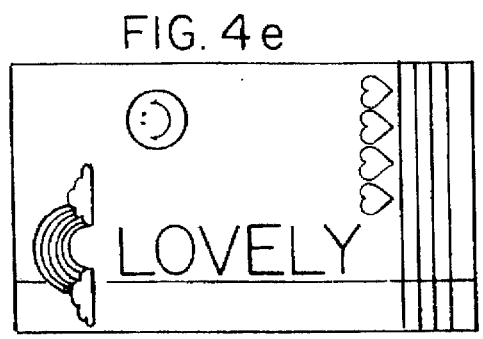
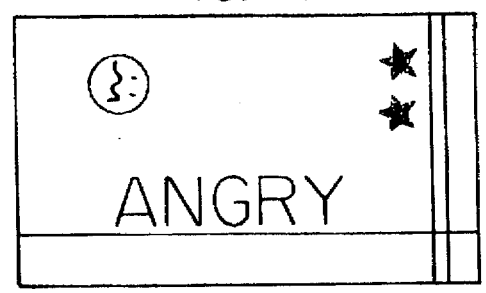
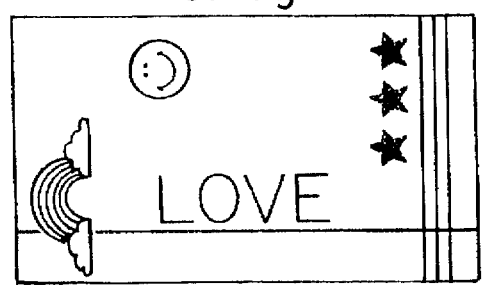
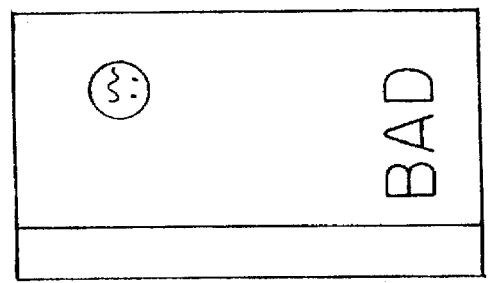

EDUCATIONAL CARDS TEACHING EMOTIONAL EXPRESSIONS

BACKGROUND OF THE INVENTION

1. Field of the Invention

The present invention relates to educational devices and more particularly pertains to new educational cards teaching emotional expressions for assisting children with recognizing emotions, thoughts, and actions in daily life.

2. Description of the Prior Art

The use of educational devices is known in the prior art. More specifically, educational devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art educational devices include U.S. Pat. Nos. 4,966,371; 3,940,863; 5,295,834; 4,927,147; 5,002,282; and U.S. Pat. No. Des. 284,878.

While these devices fulfill their respective, particular objectives and requirements, the aforementioned patents do not disclose new educational cards teaching emotional expressions. The inventive device includes a first plurality of cards having words disposed thereon representing personal attributes, and a second plurality of cards having words disposed thereon representing societal attributes. The first and second plurality of cards further include a symbol to indicate whether the personal attributes and societal attributes are positive or negative attributes. The cards also include additional symbols thereon to indicate an intensity level of the attributes and a level of self-esteem associated with the attributes.

In these respects, the educational cards teaching emotional expressions according to the present invention substantially departs from the conventional concepts and designs of the prior art, and in so doing provides an apparatus primarily developed for the purpose of assisting children with recognizing emotions, thoughts, and actions in daily life.

SUMMARY OF THE INVENTION

In view of the foregoing disadvantages inherent in the known types of educational devices now present in the prior art, the present invention provides new educational cards teaching emotional expressions wherein the same can be utilized for assisting children with recognizing emotions, thoughts, and actions in daily life.

The general purpose of the present invention, which will be described subsequently in greater detail, is to provide new educational cards teaching emotional expressions which has many of the advantages of the educational devices mentioned heretofore and many novel features that result in new educational cards teaching emotional expressions which is not anticipated, rendered obvious, suggested, or even implied by any of the prior art educational devices, either alone or in any combination thereof.

To attain this, the present invention generally comprises a first plurality of cards having words disposed thereon representing personal attributes, and a second plurality of cards having words disposed thereon representing societal attributes. The first and second plurality of cards further include a symbol to indicate whether the personal attributes and societal attributes are positive or negative attributes. The cards also include additional symbols thereon to indicate an intensity level of the attributes and a level of self-esteem associated with the attributes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new educational cards for teaching emotional expressions which has many of the advantages of the educational devices mentioned heretofore and many novel features that result in new educational cards for teaching emotional expressions which is not anticipated, rendered obvious, suggested, or even implied by any of the prior art educational devices, either alone or in any combination thereof.

It is another object of the present invention to provide new educational cards for teaching emotional expressions which may be easily and efficiently manufactured and marketed.

It is a further object of the present invention to provide new educational cards for teaching emotional expressions which is of a durable and reliable construction.

An even further object of the present invention is to provide new educational cards for teaching emotional expressions which is susceptible of a low cost of manufacture with regard to both materials and labor, and which accordingly is then susceptible of low prices of sale to the consuming public, thereby making such educational cards for teaching emotional expressions economically available to the buying public.

Still yet another object of the present invention is to provide new educational cards for teaching emotional expressions which provides in the apparatuses and methods of the prior art some of the advantages thereof, while simultaneously overcoming some of the disadvantages normally associated therewith.

Still another object of the present invention is to provide new educational cards teaching emotional expressions for assisting children with recognizing emotions, thoughts, and actions in daily life.

Yet another object of the present invention is to provide new educational cards for teaching emotional expressions which includes a first plurality of cards having words disposed thereon representing personal attributes, and a second plurality of cards having words disposed thereon representing societal attributes. The first and second plurality of cards further include a symbol to indicate whether the personal attributes and societal attributes are positive or negative attributes. The cards also include additional symbols thereon to indicate an intensity level of the attributes and a level of self-esteem associated with the attributes.

Still yet another object of the present invention is to provide new educational cards for teaching emotional expressions that helps children identify societal value systems.

Even still another object of the present invention is to provide new educational cards for teaching emotional expressions that assists in developing recognition and coping skills.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a box suitable for holding the cards of the present invention.

FIG. 2 illustrates one side of the cards.

FIG. 3 illustrates various symbols used in the present invention.

FIGS. 4a–h illustrate exemplary cards.

DESCRIPTION OF THE PREFERRED EMBODIMENT

With reference now to the drawings, and in particular to FIGS. 1 through 4a–h thereof, new educational cards for teaching emotional expressions embodying the principles and concepts of the present invention and generally designated by the reference numeral 10 will be described.

As illustrated in FIGS. 2 and 4a–h, each card is generally rectangular and defines front and back faces 12,13. The cards can be made from any particular material generally used in making cards, such as plastic, paper products, and the like. The front face 12 has numerical indicia 14 (the numbers 1–5) disposed thereon, along with a smiling face symbol 15, an inverted smiling face symbol 16, and the name "FEEL-TEA" 17. The cards 10 can come packaged in a box 18 having numerous indicia and symbols disposed thereon.

FIG. 3 illustrates the indicia/symbols which are disposed on the cards 10. A rainbow symbol 19 is used to indicate that a particular attribute (to be described later) is considered to be socially acceptable. A smiling face symbol 20, similar to the symbol 15, indicates that an attribute is a positive one. Inverted smiling face symbol 21, similar to symbol 16, indicates that an attribute is a negative one. Heart symbols 22 or star symbols 23 are used to represent an emotional intensity level of an attribute. The number of heart symbols used is either zero, four, or five, while the numbers of star symbols used ranges from zero to three. Finally, lines 24 are used to represent the self-esteem associated with an attribute. The number of lines 24 used indicates the level of self-esteem.

Common, everyday thoughts, emotions, and actions have been identified by the inventor. These thoughts, emotions, and actions are referred to as attributes. The attributes are divided into two major categories, personal attributes and societal attributes. The personal attributes include: happy, honest, aware, smart, beautiful, cute, clever, lovely, calm, clean, neat, funny, hurt, sad, depressed, anxious, moody, hungry, upset, disappointed, timid, lazy, sleepy, dirty, and ugly. The societal attributes include: aggressive, good, fear, love, hate, glad, kind, angry, sorry, surprised, shocked, shy, jealous, afraid, stupid, silly, pesky, sticky, bad, guilty, and dishonest.

FIGS. 4a–h represent examples of certain ones of the personal or societal attributes disposed on the back faces 13 of cards, along with certain ones of the symbols 19–24. For instance, in FIG. 4a, the attribute "smart" is printed on the face 13, along with the rainbow symbol 19 indicating that this attribute is socially acceptable, the smiling face symbol 20 indicating that this attribute is a positive/good attribute, five heart symbols 22 indicating that this attribute is a highly intensive emotion, and five self-esteem lines 24 indicating a high level of self-esteem associated with this attribute. FIG. 4b contains the attribute "hurt" which is not a socially acceptable attribute due to the lack of the symbol 19, is a negative attribute indicated by the inverted smiling face symbol 21, has medium emotional intensity indicated by the three star symbols 23, and medium self-esteem associated therewith, indicated by the three lines 24. FIGS. 4c–4h are analyzed in a similar fashion to gauge the attributes thereon.

In use, the cards containing all the attributes are discussed between a teacher/instructor and student(s). The student(s) can be asked to demonstrate a particular attribute so that the student(s) learns the attribute, and the instructor and student(s) can discuss whether such an attribute is generally acceptable, is a positive one or not, and the emotions and self-esteem associated with each attribute. These cards could be used either in a formal school environment, or at home for parents to teach their children.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A set of educational cards, comprising:

a first plurality of cards, each card in said first plurality of cards having a word disposed thereon which represents a personal attribute;

a second plurality of cards, each card in said second plurality of cards having a word disposed thereon which represents a societal attribute; and said first and second plurality of cards further including a symbol disposed on each of the cards which indicates whether the personal attributes and societal attributes are positive or negative attributes.

2. The set of educational cards recited in claim 1, further including an additional symbol disposed on preselected ones of the first and second plurality of cards, said additional symbol indicating that the personal and societal attributes on the preselected cards are socially acceptable.

3. The set of educational cards recited in claim 1, further including at least one additional symbol disposed on preselected ones of the first and second plurality of cards, said at least one additional symbol indicating an emotional intensity level of the personal and societal attributes on the preselected cards.

4. The set of educational cards recited in claim 3, wherein a plurality of the additional symbols are disposed on a group of the preselected cards, indicating a higher emotional intensity level of the personal and societal attributes on the cards in the group.

5. The set of educational cards recited in claim 1, further including at least one additional symbol disposed on preselected ones of the first and second plurality of cards, said at least one additional symbol indicative of self-esteem.

6. The set of educational cards recited in claim 5, wherein the number of the additional symbols disposed on the preselected cards varies, the number of additional symbols used representing the level of self-esteem.

* * * * *